US007603850B2

(12) United States Patent
Colignon

(10) Patent No.: US 7,603,850 B2
(45) Date of Patent: *Oct. 20, 2009

(54) SYSTEM FOR ASSISTING IN THE REGENERATION OF DEPOLLUTION MEANS INTEGRATED INTO AN EXHAUST LINE OF A MOTOR VEHICLE DIESEL ENGINE

(75) Inventor: Christophe Colignon, Levallois Perret (FR)

(73) Assignee: Peugeot Citroen Automobiles SA, Velizy Villacoublay (FR)

( * ) Notice: Subject to any disclaimer, the term of this patent is extended or adjusted under 35 U.S.C. 154(b) by 221 days.

This patent is subject to a terminal disclaimer.

(21) Appl. No.: 10/595,633

(22) PCT Filed: Oct. 18, 2004

(86) PCT No.: PCT/FR2004/002660

§ 371 (c)(1),
(2), (4) Date: May 1, 2006

(87) PCT Pub. No.: WO2005/047679

PCT Pub. Date: May 26, 2005

(65) Prior Publication Data

US 2007/0017214 A1    Jan. 25, 2007

(30) Foreign Application Priority Data

Nov. 7, 2003  (FR) .................................. 03 13163

(51) Int. Cl.
*F01N 3/00*  (2006.01)

(52) U.S. Cl. ............................. 60/295; 60/280; 60/286; 60/297; 60/301; 60/311

(58) Field of Classification Search .................. 60/285, 60/295, 297, 311, 274, 286, 301, 303
See application file for complete search history.

(56) References Cited

U.S. PATENT DOCUMENTS 3,157,987 A * 11/1964 Pouit ............................ 60/606

(Continued)

FOREIGN PATENT DOCUMENTS

DE         19851811 A     10/1999

(Continued)

OTHER PUBLICATIONS

International Search Report dated Feb. 15, 2005.

(Continued)

*Primary Examiner*—Thomas E Denion
*Assistant Examiner*—Diem Tran
(74) *Attorney, Agent, or Firm*—Nicolas E. Seckel

(57) ABSTRACT

A system in which the depollution means (1) are associated with oxidation catalyst-forming means (2), and the engine (4) is associated with common manifold means (7) for feeding it with fuel, and adapted to implement a regeneration strategy in at least one operation of post-injecting fuel into the cylinders, is characterized in that is comprises: detector means (8) for detecting a regeneration request (req.RG); detector means (9) for detecting a state of the foot being raised on the vehicle accelerator; temperature acquisition means (11) for acquiring the temperature downstream from the catalyst-forming means (2); means (8) for determining a maximum quantity of fuel to be injected in the post-injection operations during the period of returning to idling following the foot being raised, and on the basis of said temperature; and means (7, 8) for immediately interrupting the post-injection operation as soon as the quantity of fuel injecting has reached the maximum quantity.

10 Claims, 1 Drawing Sheet

U.S. PATENT DOCUMENTS

Figure 1:
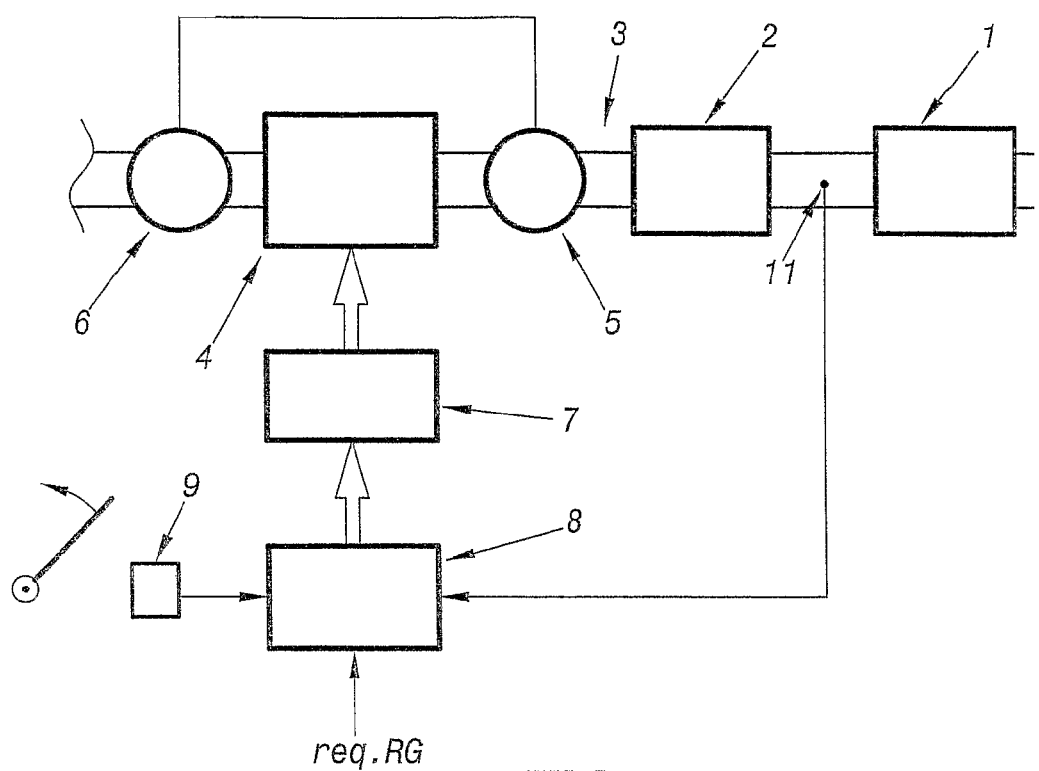

| | | | |
|---|---|---|---|
| 6,023,928 A * | 2/2000 | Peter-Hoblyn et al. | 60/274 |
| 6,289,672 B1 | 9/2001 | Katoh et al. | |
| 6,488,725 B1 * | 12/2002 | Vincent et al. | 44/358 |
| 6,568,178 B2 * | 5/2003 | Hirota et al. | 60/297 |
| 6,655,133 B2 * | 12/2003 | Mikami et al. | 60/296 |
| 6,666,020 B2 | 12/2003 | Tonetti et al. | |
| 6,802,180 B2 | 10/2004 | Gabe et al. | |
| 6,901,747 B2 | 6/2005 | Tashiro et al. | |
| 6,966,179 B2 | 11/2005 | Onodera et al. | |
| 6,969,413 B2 | 11/2005 | Yahata et al. | |
| 7,021,050 B2 | 4/2006 | Nishimura et al. | |
| 7,036,305 B2 | 5/2006 | Nishimura | |
| 2003/0033800 A1 | 2/2003 | Tonetti et al. | |
| 2003/0145581 A1 | 8/2003 | Tashiro et al. | |
| 2005/0050883 A1 | 3/2005 | Nishimura | |
| 2007/0107418 A1 | 5/2007 | Colignon | |
| 2007/0130917 A1 | 6/2007 | Colignon | |

FOREIGN PATENT DOCUMENTS

| | | |
|---|---|---|
| DE | 19957185 A | 5/2001 |
| DE | 10007049 A | 8/2001 |
| DE | 10033159 A | 1/2002 |
| EP | 1174612 A | 1/2002 |
| EP | 1176290 A | 1/2002 |
| EP | 1281852 A | 2/2003 |

OTHER PUBLICATIONS

International Search Report dated Feb. 15, 2005 in PCT/FR2004/002610 (U.S. Appl. No. 10/595,630).

International Search Report dated Mar. 7, 2005 in PCT/FR2004/002503 (U.S. Appl. No. 10/595,631).

* cited by examiner

SYSTEM FOR ASSISTING IN THE REGENERATION OF DEPOLLUTION MEANS INTEGRATED INTO AN EXHAUST LINE OF A MOTOR VEHICLE DIESEL ENGINE

The present invention relates to a system for providing assistance in regenerating depollution means associated with means forming an oxidation catalyst and integrated in an exhaust line of a motor vehicle diesel engine.

More particularly, the invention relates to a system in which the engine is associated with common manifold means for feeding the cylinders of the engine and with the fuel, and adapted, at constant torque, to implement a regeneration strategy by injecting fuel into the cylinders in at least one post-injection operation.

During the regeneration of depollution means such as, for example, a particle filter, periods during which the driver lifts the foot on the accelerator pedal (no fuel injection in normal operation), or during which the engine is idling (very low exhaust temperature), are problematical since they cause a drop in the temperature of the exhaust, i.e. in the exhaust line and in the elements integrated therein.

By using the one or more post-injection operations during such periods in the running of the engine, it is possible to limit the extent to which the temperature of the exhaust line drops by relying on the catalytic conversion of the hydrocarbons (HC) produced by burning the post-injection(s) into the engine.

However, these strategies rely on the exothermic reaction produced by the catalyst-forming means, said means, e.g. comprising an oxidation catalyst or a NOx trap with a CO/HC oxidation function, being considered as being activated.

During periods while the engine is returning to idling, after the driver has lifted the foot on the accelerator, there is no main injection nor any pilot injection, and the or each post-injection therefore does not burn in the cylinder, since it merely causes fuel to be vaporized in the form of HCs which are converted by the catalyst-forming means.

The temperature at the inlet to the oxidation catalyst-forming means is thus very low, and in spite of the exothermic catalytic reaction produced by the combustion of the HCs coming from the or each post-injection, the front face of the catalyst-forming means cools down progressively and its conversion activity becomes progressively un-primed.

During a prolonged period of returning to idling, it can happen that the catalyst-forming means are not sufficiently active to convert all of the HCs, which leads to HC peaks downstream from said catalyst-forming means, and even to blue fumes and/or to exhaust odors.

Furthermore, the use of post-injection leads to the lubricating oil being diluted by fuel, and that can degrade its lubricating properties, and in particular to a drop in viscosity, and if the viscosity becomes too low, this can lead to damage to the engine.

The object of the invention is thus to solve these problems.

To this end, the invention provides a system for assisting in the regeneration of depollution means associated with oxidation catalyst-forming means, and integrated in an exhaust line of a motor vehicle diesel engine and in which the engine is associated with common manifold means for feeding the cylinders of the engine with fuel, and adapted at constant torque to implement a regeneration strategy by injecting fuel into the cylinders in at least one post-injection operation, the system being characterized in that it comprises:

detector means for detecting a regeneration request and thus a request for post-injection;

detector means for detecting a state of the foot being raised on the vehicle accelerator;

temperature acquisition means for acquiring the temperature downstream from the catalyst-forming means;

means for determining a maximum quantity of fuel to be injected in the post-injection operations during the period of returning to idling following the foot being raised on the accelerator, and on the basis of said temperature; and means for immediately interrupting the or each post-injection operation as soon as the quantity of fuel injected has reached the predetermined maximum quantity.

According the other characteristics:

the depollution means comprise a particle filter;
the depollution means comprise a NOx trap;
the fuel includes an additive for being deposited, together with the particles with which it is mixed, on the depollution means in order to facilitate regeneration thereof;
the fuel includes an additive forming a NOx trap; and
the engine is associated with a turbocharger.

Figure 2:
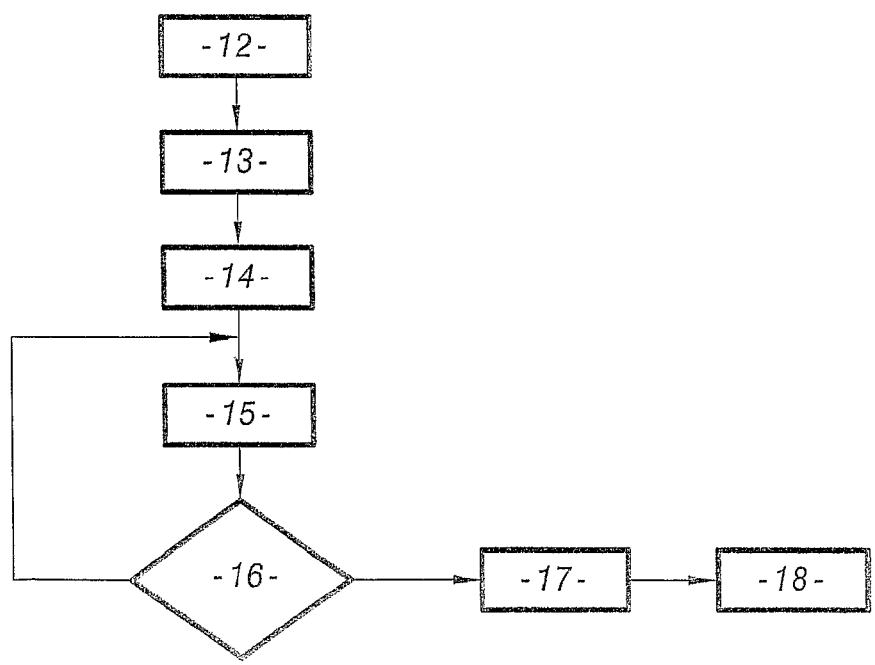

The invention can be better understood on reading the following description given purely by way of example and made with reference to the accompanying drawing, in which:

FIG. 1 is a block diagram showing the general structure of a system of the invention for assisting regeneration; and FIG. 2 is a flow chart showing the operation thereof.

FIG. 1 shows the general structure of a system for assisting the regeneration of depollution means, given overall reference 1 in this figure, associated with oxidation catalyst forming means given overall reference 2, and integrated in an exhaust line 3 of a motor vehicle diesel engine 4.

The engine may be associated with a turbocharger, in which case the turbine portion 5 thereof is likewise associated with the exhaust line, and the compressor portion 6 of the turbocharger is placed upstream from the engine.

The engine is also associated with means 7 forming a common manifold for feeding the cylinders of the engine with fuel and adapted, at constant torque, to implement a regeneration strategy by injecting fuel into the cylinders in at least one post-injection operation, in conventional manner.

These means are controlled by a pilot unit, given overall reference 8, adapted to detect a regeneration request req.RG, e.g. delivered by a supervisor of the depollution means, and thus of the post-injection operation, and connected to means 9 for detecting a state in which the foot on the vehicle accelerator has been lifted.

These means may be of any of appropriate structure.

The pilot unit 8 is also connected to means for acquiring the temperature downstream of the catalyst-forming means 2, these acquisition means being given overall reference 11.

These means comprise any appropriate temperature sensor.

On detecting a request for regeneration, and thus for post-injection, this then makes it possible for the pilot unit 8 to detect a period during which the foot on the vehicle accelerator is lifted, as represented by a step 12 in FIG. 2.

The unit 8 is then adapted to acquire the temperature downstream from the catalyst-forming means during a step 13, and during a step 14 to determine a maximum quantity of fuel to be injected during the post-injection operations during the period of regeneration while idling, after the foot on the accelerator has been lifted, and on the basis of this temperature.

Then in steps 15 and 16, the unit 8 monitors the quantity of fuel injected during the post-injection operations, and detects the moment at which this quantity of injected fuel reaches the maximum predetermined quantity.

Once the quantity of injected fuel has reached the maximum predetermined quantity during the period of returning to idling, after the foot on the accelerator has been lifted, as shown at 17, the pilot unit 8 is adapted to shut off post-injection immediately, as represented by step 18.

It should also be observed that such a system can operate with depollution means formed by a particle filter, or a NOx trap, and that it is also possible in conventional manner to mix an additive with the fuel, which additive is for being deposited, together with the particles with which it is mixed, on the depollution means in order to facilitate regeneration thereof, for the purpose of reducing the temperature at which the soot trapped thereon burns.

In conventional manner, the additive is present in the particles after the fuel containing the additive has been subjected to combustion in the engine.

It is also possible to envisage using an additive forming a NOx trap.

It can thus be understood that by means of such a structure, the quantity of fuel that is allowed to flow in post-injection during a period of returning to idling after the foot has been lifted on the accelerator is restricted to a maximum value.

This maximum quantity is present in the form of a reservoir which empties during a period of lifting the foot while regeneration is taking place. The reservoir is reinitialized at the end of the period.

The system thus makes it possible to limit the quantities of fuel post-injected during a period of raising the foot when the temperature levels in the exhaust line are the most unfavorable.

By limiting the total quantity of fuel that is post-injected during this period, which in any event is not the most effective from the point of view regenerating the depollution means, the effective proportion of post-injection time is optimized and the extent to which the lubricating oil of the engine is diluted by fuel is limited.

Finally, this also makes it possible to limit any risk of the oxidation function becoming suddenly unprimed, which would lead to a deficit in HC conversion, and thus to a puff of HCs in the exhaust that might generate fumes and/or odors.

Naturally, other embodiments could be envisaged.

Thus, for example, the depollution means and the oxidation catalyst-forming means can be integrated in a single common element, in particular on a common substrate.

By way of example, it is possible to envisage using a particle filter that integrates the oxidation function.

Similarly, a NOx trap integrating such an oxidation function could also be envisaged, with or without an additive. Such an oxidation and/or NOx trap function could be implemented, for example, by an additive mixed with the fuel.

The invention claimed is:

1. A system for assisting in the regeneration of depollution means associated with oxidation catalyst-forming means, and integrated in an exhaust line of a motor vehicle diesel engine and in which the engine is associated with common manifold means for feeding the cylinders of the engine with fuel, and adapted at constant torque to implement a regeneration strategy by injecting fuel into the cylinders in at least one post-injection operation, the system comprising:

detector means for detecting a regeneration request and thus a request for post-injection;

detector means for detecting a state of the foot being raised on the vehicle accelerator;

temperature acquisition means for acquiring the temperature downstream from the catalyst-forming means;

means for determining a maximum quantity of fuel to be injected in the post-injection operations during the period of returning to idling following the foot being raised on the accelerator, and on the basis of said temperature; and means for immediately interrupting the or each post-injection operation as soon as the quantity of fuel injected has reached the predetermined maximum quantity.

2. A system according to claim 1, wherein the fuel includes an additive for being deposited, together with the particles with which it is mixed, on the depollution means in order to facilitate regeneration thereof.

3. A system according to claim 1, wherein the fuel includes an additive forming a NOx trap.

4. A system according to claim 1, wherein the engine is associated with a turbocharger.

5. A system according to claim 1, wherein the depollution means comprise a particle filter.

6. A system according to claim 5, wherein the depollution means comprise a NOx trap.

7. A system according to claim 5, wherein the fuel includes an additive for being deposited, together with the particles with which it is mixed, on the depollution means in order to facilitate regeneration thereof.

8. A system according to claim 6, wherein the fuel includes an additive for being deposited, together with the particles with which it is mixed, on the depollution means in order to facilitate regeneration thereof.

9. A system according to claim 1, wherein the depollution means comprise a NOx trap.

10. A system according to claim 9, wherein the fuel includes an additive for being deposited, together with the particles with which it is mixed, on the depollution means in order to facilitate regeneration thereof.

* * * * *